United States Patent
Lee et al.

(10) Patent No.: US 9,979,932 B2
(45) Date of Patent: May 22, 2018

(54) SURVEILLANCE SYSTEM CONTROL METHOD AND SURVEILLANCE SYSTEM ADOPTING THE METHOD

(71) Applicant: Hanwha Techwin Co., Ltd., Changwon-Si (KR)

(72) Inventors: Joon-sung Lee, Changwon (KR); Ji-man Kim, Changwon (KR); Dong-hak Shin, Changwon (KR)

(73) Assignee: Hanwha Techwin Co., Ltd., Changwon-Si (KR)

( * ) Notice: Subject to any disclaimer, the term of this patent is extended or adjusted under 35 U.S.C. 154(b) by 612 days.

(21) Appl. No.: 13/895,702

(22) Filed: May 16, 2013

(65) Prior Publication Data

US 2014/0104432 A1 Apr. 17, 2014

(30) Foreign Application Priority Data

Oct. 12, 2012 (KR) .......................... 10-2012-0113827

(51) Int. Cl.
| | |
|---|---|
| H04N 5/33 | (2006.01) |
| H04N 5/272 | (2006.01) |
| H04N 7/18 | (2006.01) |
| H04N 5/232 | (2006.01) |
| G08B 13/196 | (2006.01) |

(52) U.S. Cl.
CPC ......... *H04N 7/18* (2013.01); *G08B 13/19682* (2013.01); *H04N 5/232* (2013.01); *H04N 5/272* (2013.01); *H04N 5/332* (2013.01)

(58) Field of Classification Search
CPC .......... H04N 7/18; H04N 5/332; H04N 5/272; H04N 5/232; G08B 13/19682
See application file for complete search history.

(56) References Cited

U.S. PATENT DOCUMENTS

| | | | |
|---|---|---|---|
| 7,800,064 B2 * | 9/2010 | Tadano | .................. H04N 5/247 250/330 |
| 7,978,201 B2 | 7/2011 | Cho et al. | |
| 2002/0003571 A1 * | 1/2002 | Schofield | ................ B60C 23/00 348/148 |
| 2007/0183657 A1 * | 8/2007 | Kidono | ................ G06K 9/2018 382/162 |

(Continued)

FOREIGN PATENT DOCUMENTS

| | | |
|---|---|---|
| CN | 101883214 A | * 11/2010 |
| JP | 2010-220042 A | 9/2010 |

(Continued)

Primary Examiner — Dave Czekaj
Assistant Examiner — Alison Slater
(74) Attorney, Agent, or Firm — Sughrue Mion, PLLC

(57) ABSTRACT

A method of controlling a surveillance system having a visible imaging camera for obtaining a visible image of an object and a display apparatus, includes providing a color visible image, from the visible imaging camera, to the display apparatus and generating a color background image by extracting a background area from the color visible image when a current ambient illuminance belongs to a daytime illuminance range, and replacing a background area of a black and white visible image, from the visible imaging camera, with the color background image and providing a mixed image as a result of the replacement to the display apparatus when the current illuminance belongs to the nighttime illuminance range.

20 Claims, 12 Drawing Sheets

(56) References Cited

U.S. PATENT DOCUMENTS

| | | | |
|---|---|---|---|
| 2010/0201709 A1 | 8/2010 | Yang et al. | |
| 2010/0289885 A1* | 11/2010 | Lu | H04N 5/2258 348/61 |
| 2010/0309315 A1* | 12/2010 | Hogasten | H04N 5/33 348/164 |
| 2012/0106797 A1* | 5/2012 | Wang | H04N 7/18 382/103 |

FOREIGN PATENT DOCUMENTS

| | | |
|---|---|---|
| KR | 10-0735283 B1 | 7/2007 |
| KR | 10-2010-0090467 A | 8/2010 |
| KR | 10-1104199 B1 | 1/2012 |

* cited by examiner

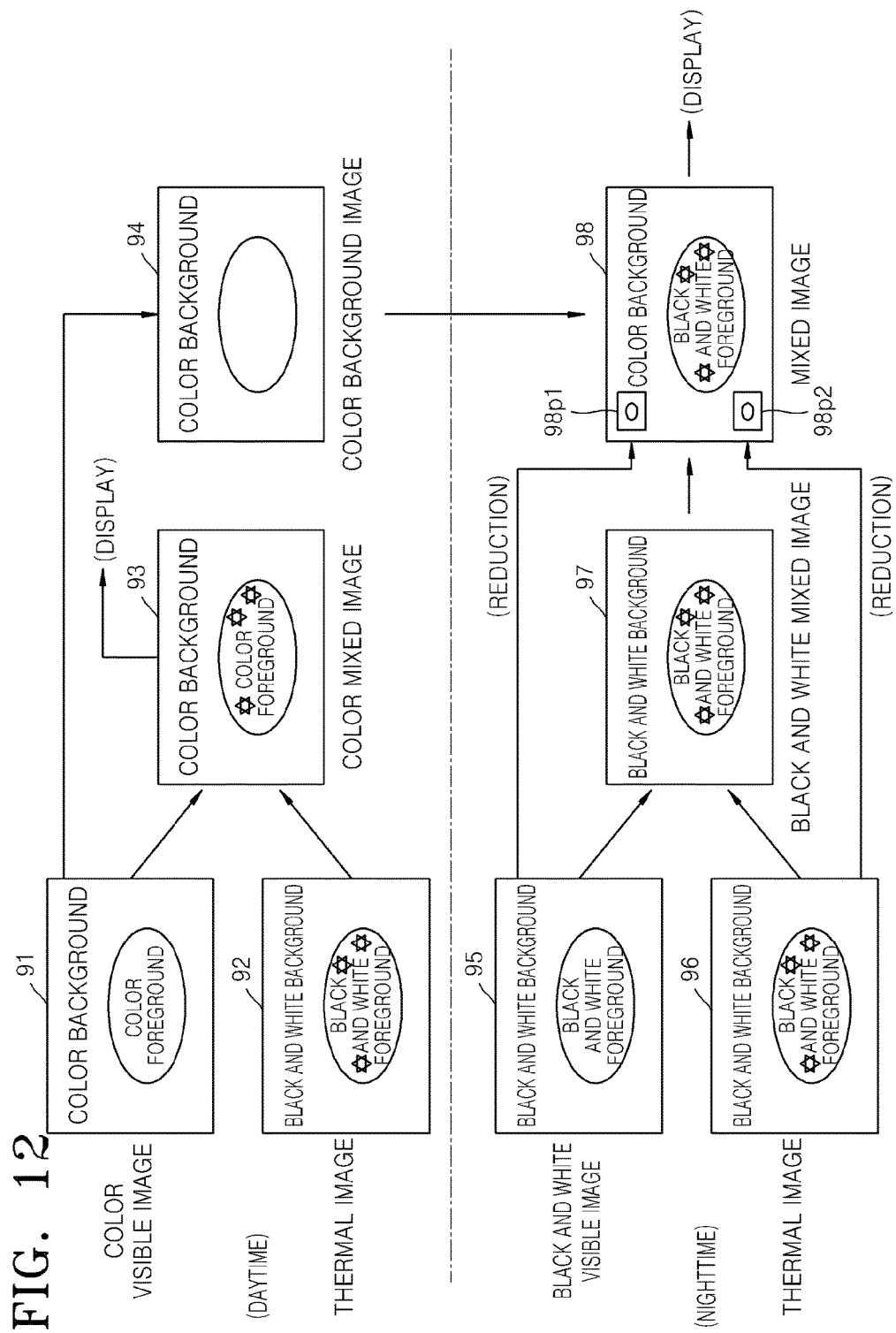

SURVEILLANCE SYSTEM CONTROL METHOD AND SURVEILLANCE SYSTEM ADOPTING THE METHOD

CROSS-REFERENCE TO RELATED PATENT APPLICATIONS

This application claims priority from Korean Patent Application No. 10-2012-0113827, filed on Oct. 12, 2012, in the Korean Intellectual Property Office, the disclosure of which is incorporated herein in its entirety by reference.

BACKGROUND

1. Field

Exemplary embodiments relate to a method of controlling a surveillance system having a camera and a display apparatus, and a surveillance system adopting the method.

2. Description of the Related Art

A related art visible imaging camera, for obtaining a visible image of an object, generates a color visible image in a daytime illuminance range and a black and white visible image in a nighttime illuminance range. Accordingly, in a related art surveillance system having the related art visible imaging camera and a display apparatus, a surveillant which observes a moving picture through the display apparatus in the nighttime illuminance range has low information recognition and situation handling abilities.

To address the above issue, a related art thermal imaging camera for obtaining a thermal image, according to the temperature of an object may be used. When a current ambient illuminance belonging to a daytime illuminance range, a color visible image belonging to a visible imaging camera, and a thermal image belonging to a thermal imaging camera are mixed with each other, a color mixed image is displayed. Further, when the current ambient illuminance belonging to a nighttime illuminance range, a black and white image belonging to the visible imaging camera, and a thermal image belonging to the thermal imaging camera are mixed with each other, a black and white mixed image is displayed.

Thus, in a surveillance system with additional thermal imaging camera, the surveillant's information recognition and situation handling abilities may be improved. However, since a black and white mixed image is still displayed in the nighttime illuminance range, the surveillant's information recognition and situation handling abilities are still lower than the daytime illuminance range.

SUMMARY

Exemplary embodiments may provide a method of controlling a surveillance system by which surveillant's information recognition and situation handling abilities in a nighttime illuminance range may be approximately equal to a daytime illuminance range, and a surveillance system adopting the method.

According to an aspect of the exemplary embodiment, a method of controlling a surveillance system having a visible imaging camera for obtaining a visible image of an object and a display apparatus, includes, when a current ambient illuminance belongs to a daytime illuminance range, providing a color visible image from the visible imaging camera to the display apparatus and generating a color background image by extracting a background area from the color visible image, and when a current ambient illuminance belongs to a nighttime illuminance range, replacing a background area of a black and white visible image from the visible imaging camera with the color background image and providing a mixed image as a result of the replacement to the display apparatus.

A medium illuminance range may be set between the nighttime illuminance range and the daytime illuminance range. When the current ambient illuminance is changed from the medium illuminance range to the nighttime illuminance range while the visible imaging camera generates a color visible image, the visible imaging camera may generate not the color visible image but a black and white visible image. When the current ambient illuminance is changed from the medium illuminance range to the daytime illuminance range while the visible imaging camera generates a black and white visible image, the visible imaging camera may generate not the black and white visible image but a color visible image.

In the providing of the mixed image as a result of the replacement to the display apparatus when the current ambient illuminance belongs to the nighttime illuminance range, a reduced image of the black and white visible image to be displayed in at least one window in a picture-in-picture (PIP) format according to user input may be provided to the display apparatus.

According to another aspect of the exemplary embodiments, a method of controlling a surveillance system having a visible imaging camera for obtaining a visible image of an object, a thermal imaging camera for obtaining a thermal image according to a temperature of the object, and a display apparatus, includes, when a current ambient illuminance belongs to a daytime illuminance range, generating a color background image by extracting a background area from a color visible image from the visible imaging camera, and when a current ambient illuminance belongs to a nighttime illuminance range, mixing a black and white visible image from the visible imaging camera and a thermal image from the thermal imaging camera to generate a black and white mixed image as a result of the mixing, replacing a background area of a generated black and white mixed with the color background image, and providing a mixed image as a result of the replacement to the display apparatus.

According to another aspect of the exemplary embodiments, in a surveillance system having a visible imaging camera for obtaining a visible image of an object, a display apparatus, and a control apparatus, when a current ambient illuminance belongs to a daytime illuminance range, the control apparatus provides a color visible image from the visible imaging camera to the display apparatus and generates a color background image by extracting a background area from the color visible image, and when a current ambient illuminance belongs to a nighttime illuminance range, the control apparatus replaces a background area of a black and white visible image from the visible imaging camera with the color background image and provides a mixed image as a result of the replacement to the display apparatus.

According to another aspect of the exemplary embodiments, in a surveillance system having a visible imaging camera for obtaining a visible image of an object, a thermal imaging camera for obtaining a thermal image according to a temperature of the object, a display apparatus, and a control apparatus, when a current ambient illuminance belongs to a daytime illuminance range, the control apparatus generates a color background image by extracting a background area from the color visible image from the visible imaging camera, and when a current ambient illuminance belongs to a nighttime illuminance range, the control apparatus mixes a black and white visible image from the visible imaging camera and a thermal image from the thermal imaging camera to generate a black and white mixed image as a result of the mixing, replaces a background area of a generated black and white visible image with the color background image, and provides a mixed image as a result of the replacement to the display apparatus.

According to the method of controlling a surveillance system according to one aspect of the exemplary embodiments, and the surveillance system adopting the method, when the current ambient illuminance belongs to the daytime illuminance range, a background area is extracted from a color visible image. Thus, a color background image is generated.

When the current ambient illuminance belongs to the nighttime illuminance range, a background area of a black and white visible image from a visible imaging camera is replaced with the color background image, and a mixed image, as a result of the replacement, is provided to a display apparatus.

According to the method of controlling a surveillance system according to another aspect of the exemplary embodiments, and the surveillance system adopting the method, when the current ambient illuminance belongs to the daytime illuminance range, a background area is extracted from a color visible image from a visible imaging camera. Thus, a color background image is generated.

When the current ambient illuminance belongs to the nighttime illuminance range, a black and white visible image from a visible imaging camera and a thermal image from a thermal imaging camera are mixed, a black and white mixed image is generated. Then, a background area of the generated black and white visible image is replaced with the color background image, and a mixed image, as a result of the replacement, is provided to a display apparatus.

In summary, when the current ambient illuminance belongs to the daytime illuminance range, a color background image is generated. Further, when the current ambient illuminance belongs to the nighttime illuminance range, a black and white background image is replaced with a color background image.

Thus, even when the current ambient illuminance belongs to the nighttime illuminance range, a surveillant observing a moving picture through the display apparatus may quickly and accurately recognize a background image. Thus, the surveillant may quickly and accurately recognize a black and white foreground image in the color background image. In other words, surveillant's information recognition and situation handling abilities in the nighttime illuminance range may be equivalent to those in the daytime illuminance range.

BRIEF DESCRIPTION OF THE DRAWINGS

The above and other features and advantages of the exemplary embodiments will become more apparent by describing in detail exemplary embodiments thereof with reference to the attached drawings in which:

FIG. 12 schematically illustrates an example of a process of forming an image to be displayed in a daytime or nighttime illuminance range, in the control operation of FIG. 8 or 10.

DETAILED DESCRIPTION OF THE INVENTION

Figure 1:
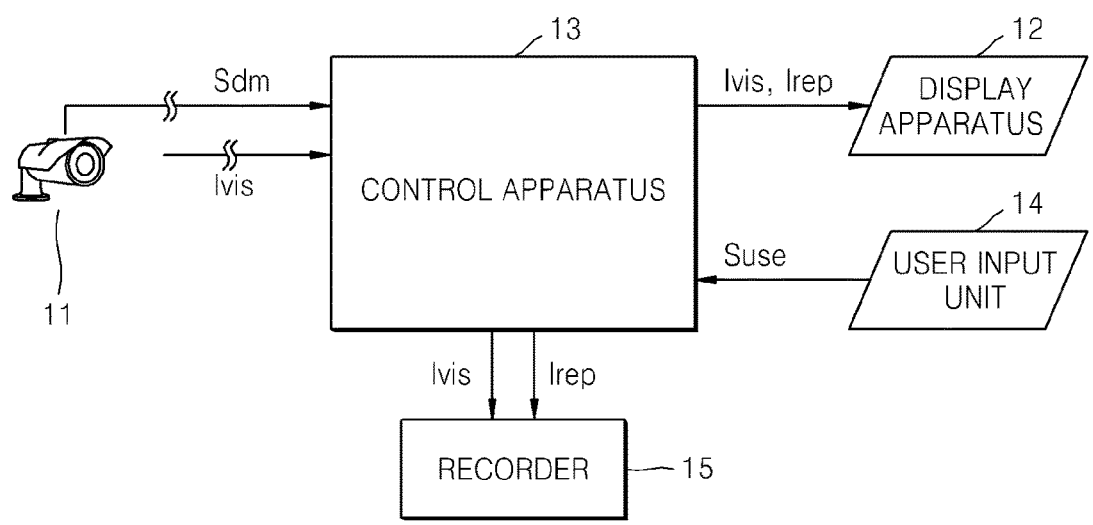
FIG. 1 schematically illustrates a surveillance system adopting a control method according to an embodiment.

The attached drawings for illustrating exemplary embodiments are referred to in order to gain a sufficient understanding of the exemplary embodiments, the merits thereof, and the objectives accomplished by the implementation of the exemplary embodiments. Hereinafter, the exemplary embodiments will be described in detail with reference to the attached drawings. Like reference numerals in the drawings denote like elements. Expressions such as "at least one of," when preceding a list of elements, modify the entire list of elements and do not modify the individual elements of the list.

FIG. 1 schematically illustrates a surveillance system adopting a control method according to an embodiment. Referring to FIG. 1, the surveillance system adopting a control method according to the present embodiment includes a visible imaging camera 11, a display apparatus 12, a control apparatus 13, a user input unit 14, and a recorder 15.

The visible imaging camera 11 obtains a color visible image Ivis of an object, and provides the obtained color visible image Ivis to the control apparatus 13. An optical sensor, included in the visible imaging camera 11, provides the control apparatus 13 with an illuminance sensing signal Sdm, which indicates whether a current ambient illuminance is a daytime illuminance range or a nighttime illuminance range.

The control apparatus 13 is operated by a user input signal Suse, which is input from the user input unit 14. When the current ambient illuminance belongs to the daytime illuminance range, the control apparatus 13 provides the color visible image Ivis from the visible imaging camera 11 to the display apparatus 12 and the recorder 15, and extracts a background area from the color visible image Ivis. Thus, a color background image is generated.

When the current ambient illuminance belongs to the nighttime illuminance range, the control apparatus 13 replaces a background area of a black and white visible image Ivis from the visible imaging camera 11 with the color background image, and provides the display apparatus 12 with a mixed image Irep, which is a result of the replacement. Further, the control apparatus 13 provides the recorder 15 with the mixed image Irep, and the black and white visible image Ivis.

Figure 2:
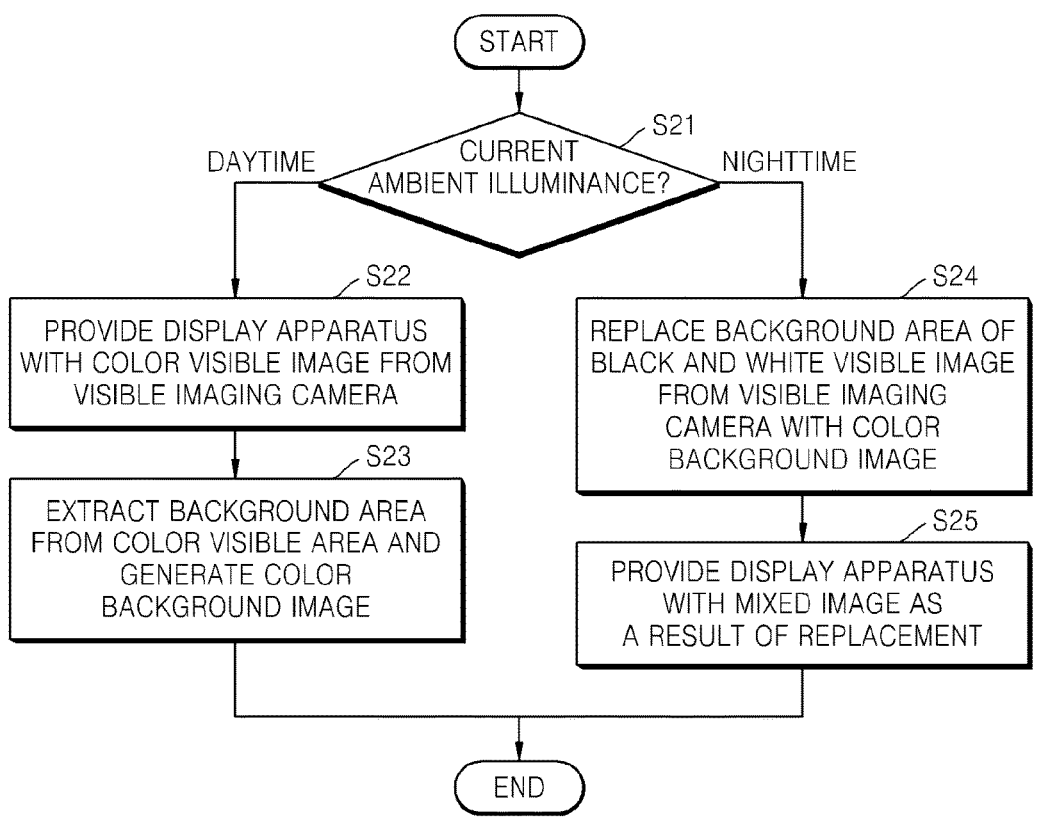
FIG. 2 is a flowchart for explaining a control operation of the surveillance system of FIG. 1.
Figure 3:
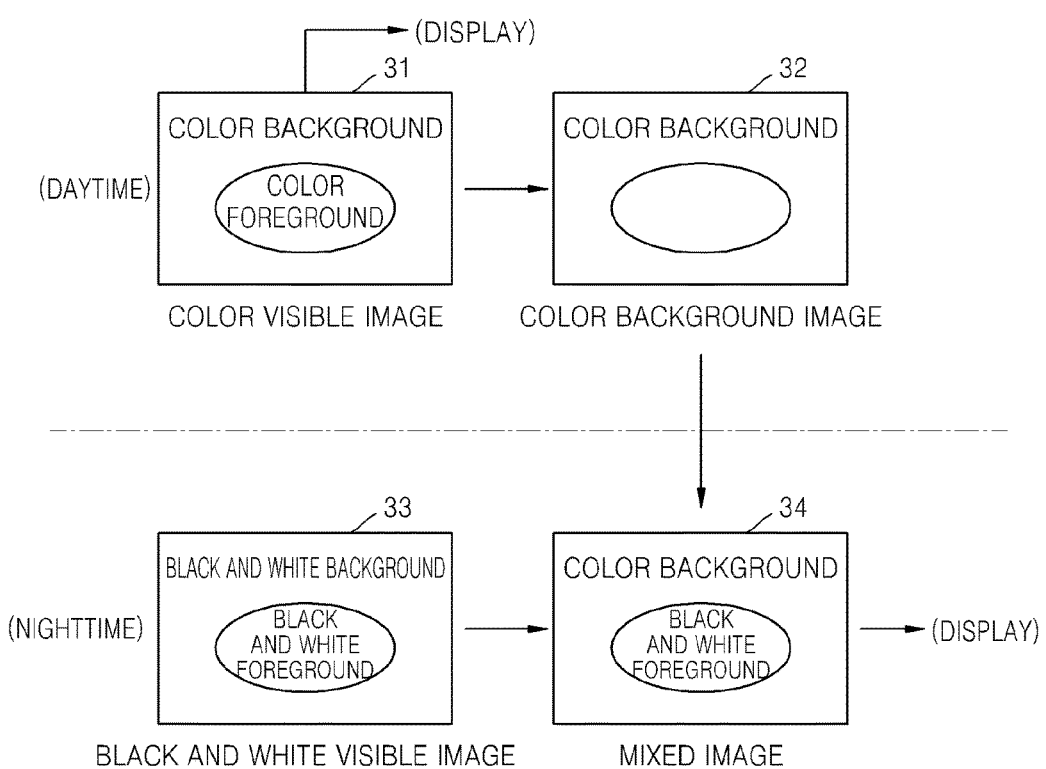
FIG. 3 schematically illustrates an example of a process of forming an image to be displayed in a daytime or nighttime illuminance range, in the control operation of FIG. 2.

FIG. 2 is a flowchart for explaining a control operation of the control apparatus 13 of FIG. 1. FIG. 3 schematically illustrates an example of the control operation of FIG. 2, in which an image is formed and displayed in the daytime or the nighttime illuminance range. An example of the control operation of FIG. 2 is described below with reference to FIGS. 1 through 3.

When the current ambient illuminance belongs to the daytime illuminance range (S21), the control apparatus 13 provides the display apparatus 12 with a color visible image Ivis 31 from the visible imaging camera 11 (S22). Further, the control apparatus 13 extracts a background area from the color visible image Ivis 31 and generates a color background image 32 (S23).

When the current ambient illuminance belongs to the nighttime illuminance range (S21), the control apparatus 13 replaces a background area of a black and white visible image Ivis 33 from the visible imaging camera 11 with the color background image 32 (S24). Further, the control apparatus 13 provides the display apparatus 12 with a mixed image Irep 34, which is a result of the replacement (S25).

For reference, an infrared (IR) image may be generated while the visible imaging camera 11 uses an IR illumination apparatus (not shown) in the nighttime illumination range. In this case, the black and white visible image Ivis 33 from the visible imaging camera 11 includes an IR image.

In summary, when the current ambient illuminance belongs to the daytime illuminance range, the color background image 32 is generated. When the current ambient illuminance belongs to the nighttime illuminance range, the black and white background image is replaced with the color background image 32.

Thus, when the current ambient illuminance belongs to the nighttime illuminance range, a surveillant observing a moving picture through the display apparatus 12 may quickly and accurately recognize a background image. Thus, the surveillant may quickly and accurately recognize a black and white foreground image in the color background image 32. In other words, the surveillant's information recognition and situation handling abilities in the nighttime illuminance range may be equivalent to those in the daytime illuminance range.

Figure 4:
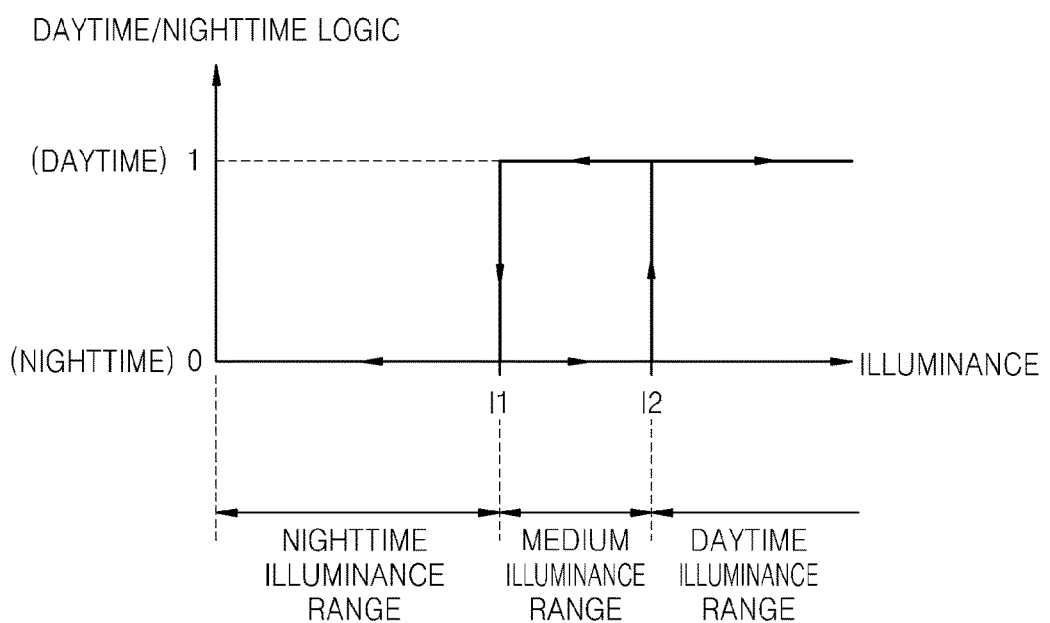
FIG. 4 is a graph showing a case in which three illumination ranges are applied to the surveillance system of FIG. 1.

In operations S24 and S25, when the background area of the black and white visible image Ivis 33 and the area of the color background image 32 are not matched with each other, the black and white visible image Ivis 33 may be provided to the display apparatus 12 without a change. FIG. 4 is a graph showing a case in which three illumination ranges are applied to the control apparatus 13 of FIG. 1.

Referring to FIGS. 1, 3, and 4, a medium illuminance range (I1~I2) is set between the daytime illuminance range (over I2) and the nighttime illuminance range (0~I1). When the current ambient illuminance is changed from the medium illuminance range (I1~I2) to the nighttime illuminance range (0~I1) while the visible imaging camera 11 generates the color visible image Ivis 31, the visible imaging camera 11 generates the black and white visible image Ivis 33 instead of the color visible image Ivis 31.

Also, when the current ambient illuminance is changed from the medium illuminance range (I1~I2) to the daytime illuminance range (over I2) while the visible imaging camera 11 generates the black and white visible image Ivis 33, the visible imaging camera 11 generates the color visible image Ivis 31 instead of the black and white visible image Ivis 33.

For reference, in FIG. 4, a first threshold value I1 and a second threshold value I2 may be set differently according to a switching frequency between the color visible image Ivis 31 and the black and white visible image Ivis 33. For example, in a high switching frequency mode, the first threshold value I1 and the second threshold value I2 are set to 2.6 lux and 4.2 lux, respectively. Also, in a low switching frequency mode, the first threshold value I1 and the second threshold value I2 are set to 1.2 lux and 6.0 lux, respectively.

Figure 5:
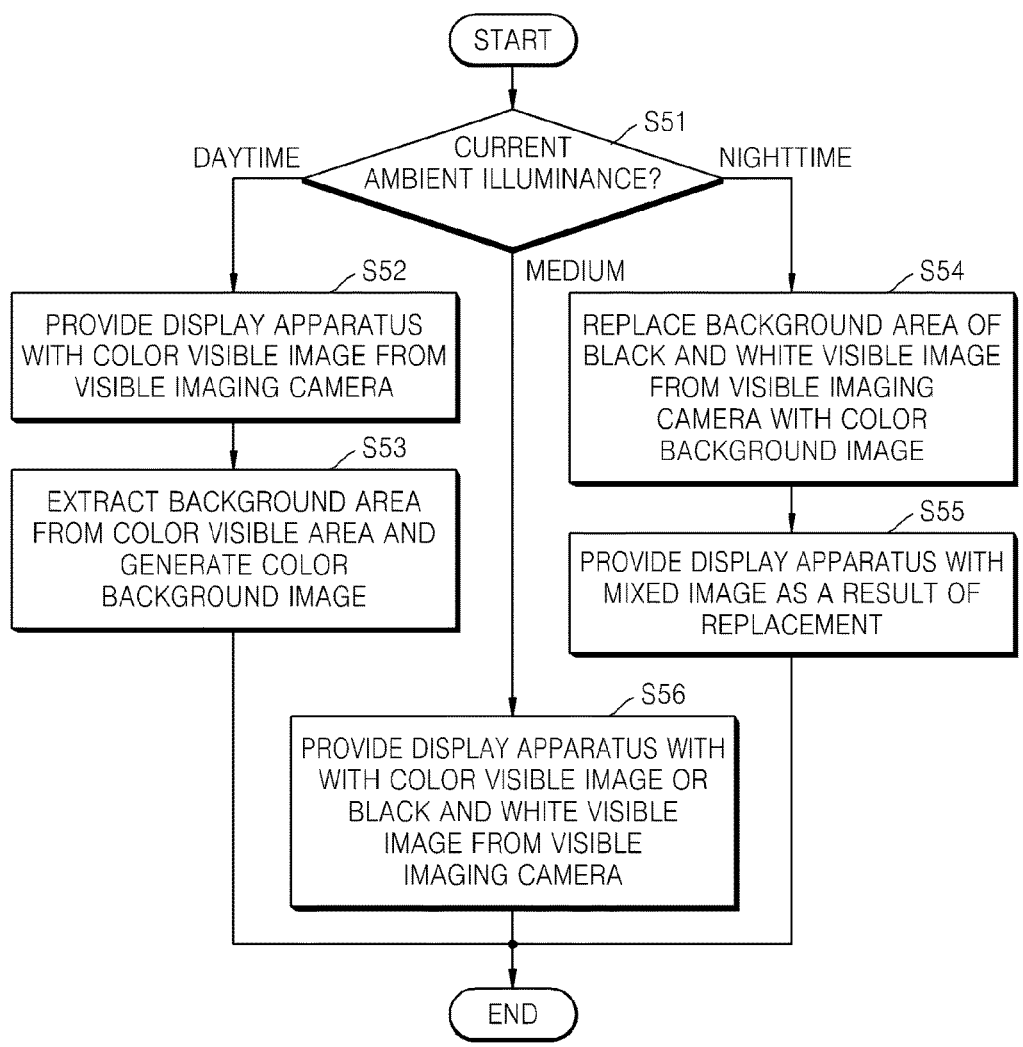
FIG. 5 is a flowchart for explaining an example of a control operation of the surveillance system of FIG. 1 when the illuminance ranges of FIG. 4 are used.

FIG. 5 is a flowchart for explaining an example of a control operation of the control apparatus 13 of FIG. 1 when the illuminance ranges of FIG. 4 are used. An example of the control operation of FIG. 5 is described below with reference to FIGS. 1, 3, and 5.

When the current ambient illuminance belongs to the daytime illuminance range (S51), the control apparatus 13 provides the display apparatus 12 with a color visible image Ivis 31 from the visible imaging camera 11 (S52). Further, the control apparatus 13 extracts a background area from the color visible image Ivis 31 and generates a color background image 32 (S53).

When the current ambient illuminance belongs to the nighttime illuminance range (S51), the control apparatus 13 replaces a background area of the black and white visible image Ivis 33 from the visible imaging camera 11 with the color background image 32 (S54). Further, the control apparatus 13 provides the display apparatus 12 with the mixed image Irep 34, which is a result of the replacement (S55).

In operations S54 and S55, when the background area of the black and white visible image Ivis 33 and the area of the color background image 32 are not matched with each other, the black and white visible image Ivis 33 may be provided to the display apparatus 12 without a change. As described above, the visible imaging camera 11 may generate an IR image by using an IR illuminance apparatus (not shown) in the nighttime illuminance range. In this case, the black and white visible image Ivis 33 from the visible imaging camera 11 includes an IR image.

When the current illuminance range belongs to a medium illuminance range (S51), the control apparatus 13 provides the display apparatus 12 with the color visible image Ivis 31 or the black and white visible image Ivis 33 from the visible imaging camera 11 (S56).

Figure 6:
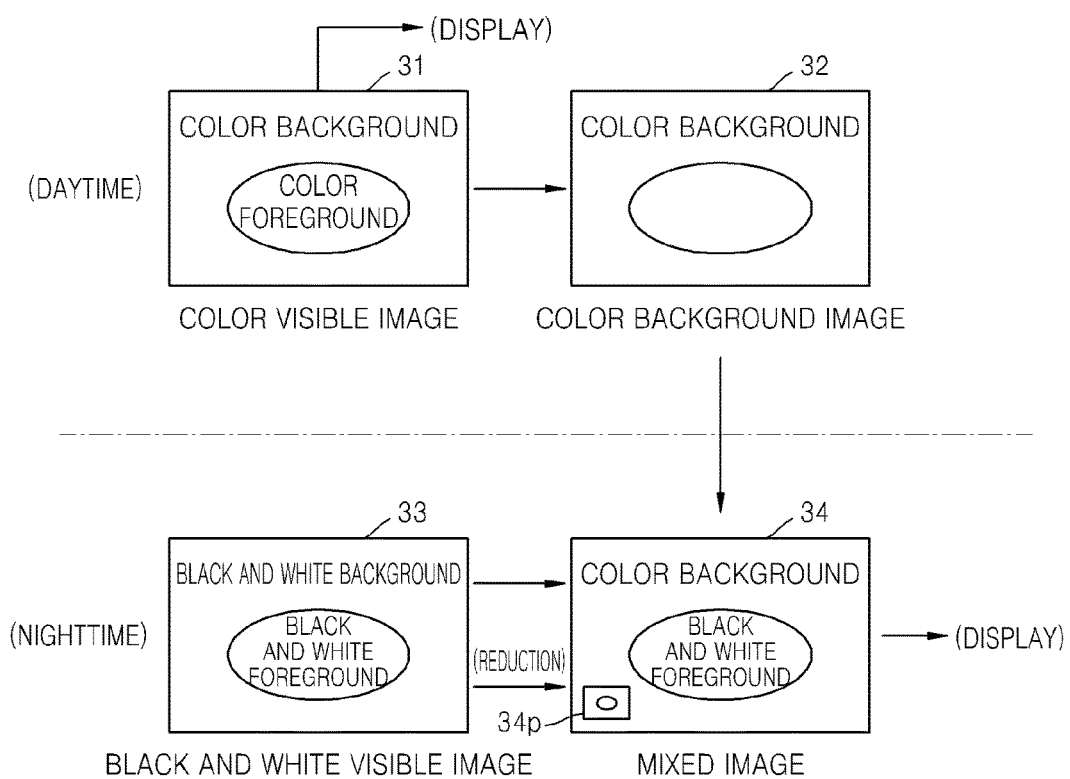
FIG. 6 schematically illustrates another example of a process of forming an image to be displayed in a daytime or nighttime illuminance range, in the control operation of FIG. 2 or 5.

FIG. 6 schematically illustrates another example of the control operation of FIG. 2 or FIG. 5, in which an image is formed and displayed in the daytime or nighttime illuminance range. In FIGS. 3 and 6, like reference numerals denote like elements having the same functions. Accordingly, the following description focuses only on differences from the embodiment of FIG. 3.

Referring to FIGS. 1 and 6, when the mixed image Irep 34 of the replacement result is provided to the display apparatus 12 in the nighttime illuminance range, the control apparatus 13 provides the display apparatus 12 with a reduced image 34p of the black and white visible image 33, to be displayed in at least one window in a picture-in-picture (PIP) format, according to a user input through the user input unit 14.

In other words, while the mixed image Irep 34 is being displayed, the reduced image 34p of an actual black and white background and foreground is displayed. Accordingly, the surveillant's information recognition and situation handling abilities in the nighttime illuminance range may be further improved. In addition, the display position and size of the reduced image 34p of the black and white visible image 33 may be adjusted by user manipulation of the user input unit 74.

Figure 7:
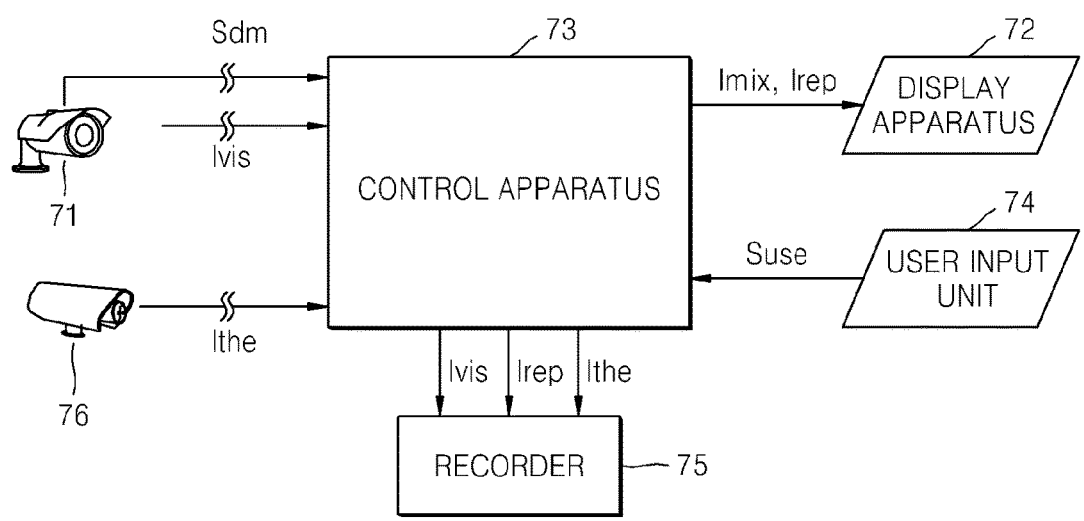
FIG. 7 schematically illustrates a surveillance system adopting a control method according to another embodiment.

FIG. 7 schematically illustrates a surveillance system adopting a control method according to another embodiment. Referring to FIG. 7, the surveillance system adopting a control method according to the present embodiment includes a visible imaging camera 71, a display apparatus 72, a control apparatus 73, a user input unit 74, a recorder 75, and a thermal imaging camera 76.

The visible imaging camera 71 obtains a visible image Ivis of an object, and provides the obtained visible image Ivis to the control apparatus 73. An optical sensor, included in the visible imaging camera 71, provides the control apparatus 73 with an illuminance sensing signal Sdm, which indicates whether a current ambient illuminance is either the daytime illuminance range or the nighttime illuminance range.

The control apparatus 73 is operated by a user input signal Suse, which is input from the user input unit 74. When the current ambient illuminance belongs to the daytime illuminance range, the control apparatus 73 provides the color visible image Ivis, from the visible imaging camera 71, and the thermal image Ithe, from the thermal imaging camera 76, to the recorder 75, mixes the color visible image Ivis and the thermal image Ithe, provides a color mixed image Imix as a result of the mixing to the display apparatus 72, and extracts a background area from the color visible image Ivis from the visible imaging camera 71. Thus, a color background image is generated.

When the current ambient illuminance belongs to the nighttime illuminance range, the control apparatus 73 mixes the black and white visible image Ivis from the visible imaging camera 71 and the thermal image Ithe from the thermal imaging camera 76, generates a black and white mixed image Imix as a result of the mixing, replaces a background area of the generated black and white mixed image Imix with the color background image, and provides the mixed image Irep as a result of the replacement, the black and white visible image Ivis, and the thermal image Ithe, to the recorder 75.

Figure 8:
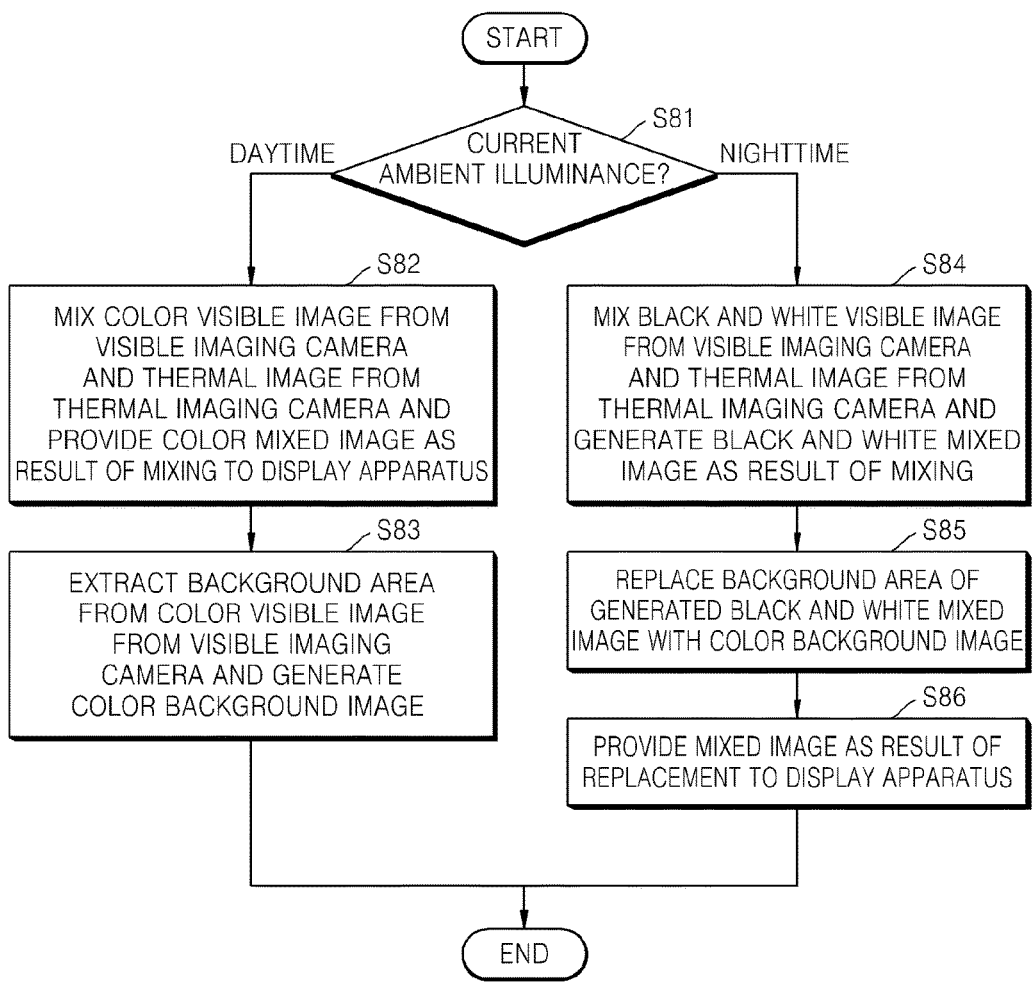
FIG. 8 is a flowchart for explaining an example of a control operation of the surveillance system of FIG. 7.
Figure 9:
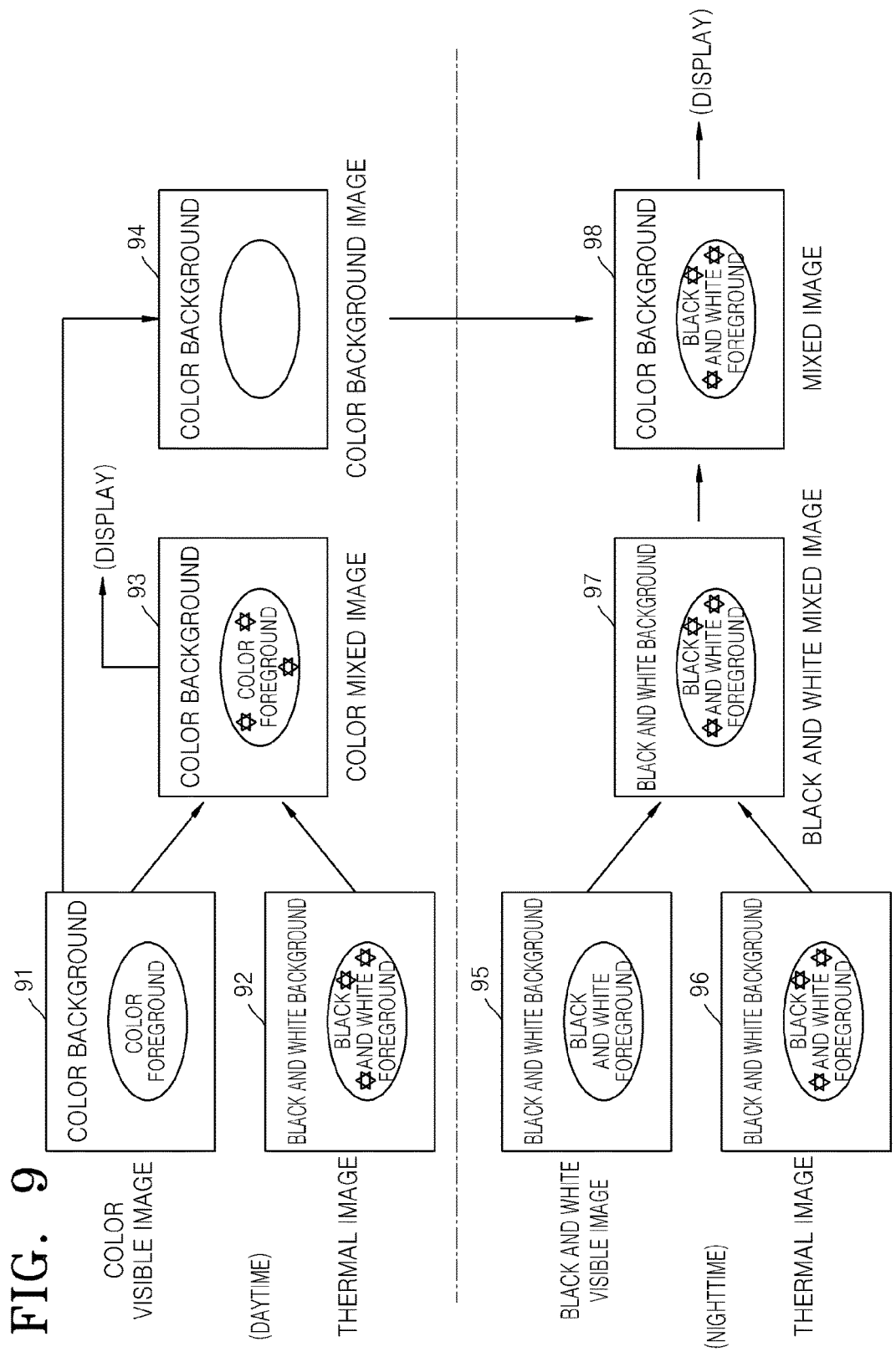
FIG. 9 schematically illustrates an example of a process of forming an image to be displayed in a daytime or nighttime illuminance range, in the control operation of FIG. 8.

FIG. 8 is a flowchart for explaining an example of a control operation of the control apparatus 73 of FIG. 7. FIG. 9 schematically illustrates an example of the control operation of FIG. 8, in which an image is formed and displayed in the daytime or nighttime illuminance range. Referring to FIGS. 7 through 9, an example of the control operation of FIG. 8 is described below.

When the current ambient illuminance belongs to the daytime illuminance range (S81), the control apparatus 73 mixes the color visible image Ivis 91, from the visible imaging camera 71, and the thermal image Ithe 92, from the thermal imaging camera 76, and provides the color mixed image Imix 93 as a result of the mixing to the display apparatus 72 (S82). Further, the control apparatus 73 extracts a background area from the color visible image Ivis 91 from the visible imaging camera 71, and generates a color background image 94 (S83).

When the current ambient illuminance belongs to the nighttime illuminance range (S81), the control apparatus 73 mixes the black and white visible image Ivis 95, from the visible imaging camera 71, and a thermal image Ithe 96, from the thermal imaging camera 76, and generates the black and white mixed image Imix 97 as a result of the mixing (S84), replaces a background area of the generated black and white mixed image Imix 97 with the color background image 94 (S85), and provides the mixed image Irep 98 as a result of the replacement to the display apparatus 72 (S86).

As described above, in the nighttime illuminance range, an infrared image may be generated when the visible imaging camera 71 uses an infrared illumination apparatus. In this case, the black and white visible image Ivis 95, from the visible imaging camera 71, includes an infrared image.

In summary, when the current ambient illuminance belongs to the daytime illuminance range, the color background image 94 is generated. When the current ambient illuminance belongs to the nighttime illuminance range, the black and white image is replaced with the color background image 94.

Thus, even when the current ambient illuminance belongs to the nighttime illuminance range, a surveillant observing a moving picture through the display apparatus 72 may quickly and accurately recognize a background image. Thus, the surveillant may quickly and accurately recognize a black and white foreground image in the color background image 94. In other words, surveillant's information recognition and situation handling abilities in the nighttime illuminance range may be equivalent to those in the daytime illuminance range.

In operations S84 through S86, when the background area of the black and white visible image Ivis 95 and the area of the color background image 94 are not matched with each other, the black and white visible image Ivis 95 may be provided to the display apparatus 72 without a change.

In the images 92, 93, 96, and 97 of FIG. 9, three starred areas indicate areas of the thermal images 92 and 96, which are part of the color mixed image 93 and the black and white mixed image 97, respectively.

Figure 10:
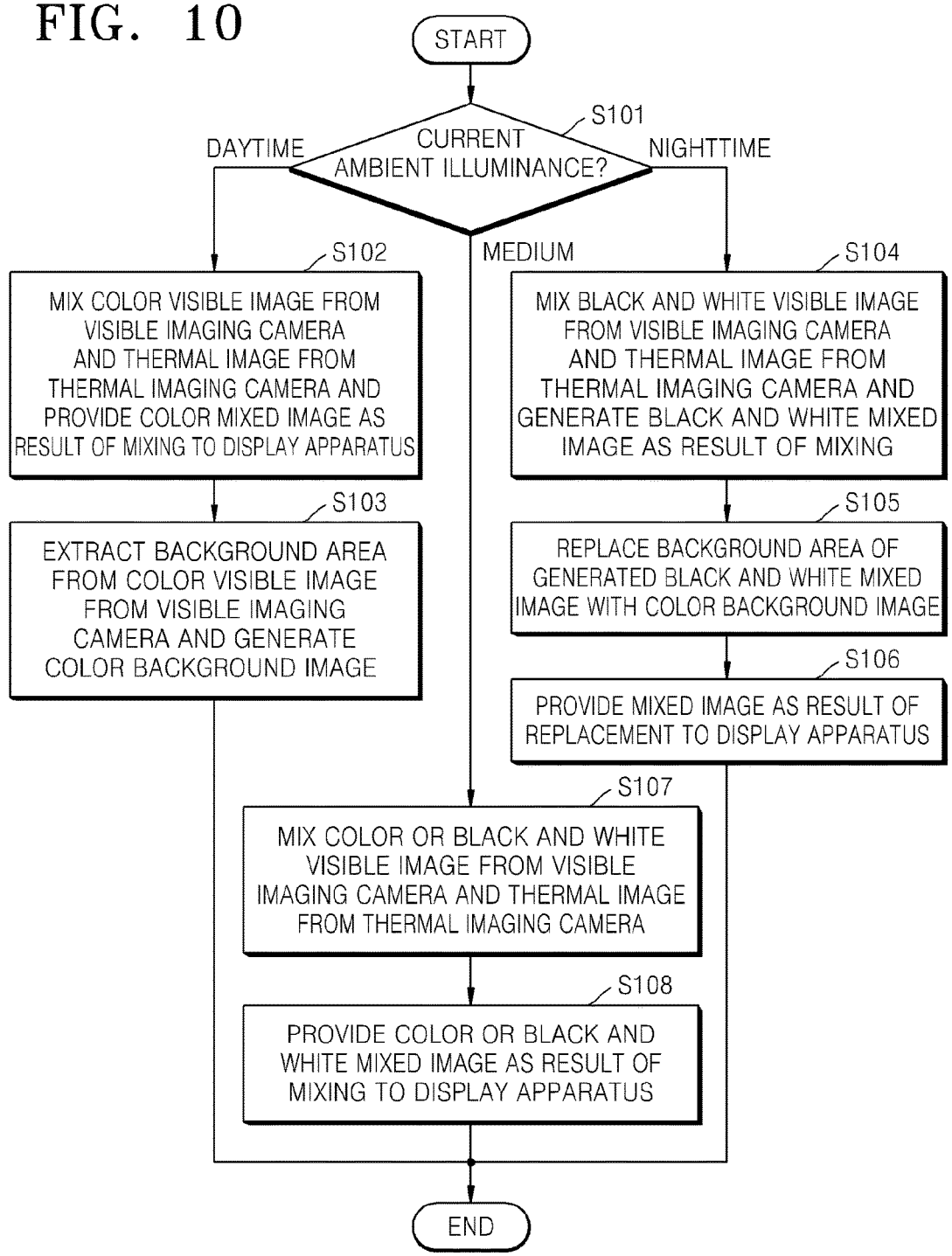
FIG. 10 is a flowchart for explaining an example of a control operation of the surveillance system of FIG. 7 when the illumination ranges of FIG. 4 are used.

FIG. 10 is a flowchart for explaining an example of a control operation of the control apparatus 73 of FIG. 7 when the illumination ranges of FIG. 4 are used. Referring to FIGS. 7, 9, and 10, the example of the control operation of FIG. 10 is described below.

When the current ambient illuminance belongs to the daytime illuminance range (S101), the control apparatus 73 mixes the color visible image Ivis 91, from the visible imaging camera 71, and the thermal image Ithe 92, from the thermal imaging camera 76, and provides the color mixed image Imix 93 as a result of the mixing to the display apparatus 72 (S102). Further, the control apparatus 73 extracts a background area from the color visible image Ivis 91 from the visible imaging camera 71, and generates the color background image 94 (S103).

When the current ambient illuminance belongs to the nighttime illuminance range (S101), the control apparatus 73 mixes the black and white visible image Ivis 95, from the visible imaging camera 71, and the thermal image Ithe 96, from the thermal imaging camera 76, and generates the black and white mixed image Imix 97 as a result of the mixing (S104), replaces a background area of the generated black and white mixed image Imix 97 with the color background image 94 (S105), and provides the mixed image Irep 98 as a result of the replacement to the display apparatus 72 (S106).

In operations S104 through S106, when the background area of the black and white visible image Ivis 95 and the area of the color background image 94 are not matched with each other, the black and white visible image Ivis 95 may be provided to the display apparatus 72 without a change. As described above, the visible imaging camera 71 may generate an IR image using an IR illuminance apparatus (not shown) in the nighttime illuminance range. In this case, the black and white visible image Ivis 95, from the visible imaging camera 71, includes an IR image.

When the current illuminance range belongs to a medium illuminance range (S101), the control apparatus 73 mixes the color visible image Ivis 93 or the black and white visible image Ivis 97, from the visible imaging camera 71, and the thermal image Ithe 92, from the thermal imaging camera 76 (S107). Further, the control apparatus 73 provides the display apparatus 72 with the color visible image Ivis 93 or the black and white visible image Ivis 97, as a result of the mixing (S108).

Figure 11:
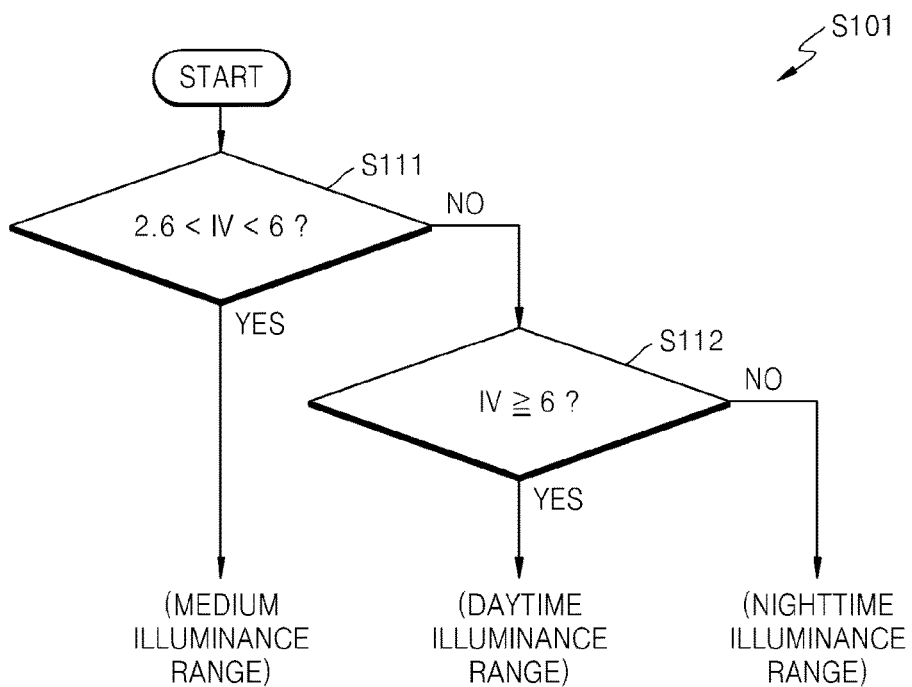
FIG. 11 is a flowchart for explaining an example of a process of an operation S101 of FIG. 10.

FIG. 11 is a flowchart for explaining an example of a process of an operation S101 of FIG. 10. Referring to FIG. 11, when the current ambient illuminance is greater than 2.6 lux and less than 6 lux, the current ambient illuminance is determined to belong to the medium illuminance range (S111). Next, when the current ambient illuminance is not greater than 2.6 lux and not less than 6 lux, and the current ambient illuminance is greater than or equal to 6 lux, the current ambient illuminance is determined to belong to the daytime illuminance range (S112). Otherwise, current ambient illuminance is determined to belong to the nighttime illuminance range (S112).

FIG. 12 schematically illustrates an example of a process of forming an image to be displayed in the daytime or nighttime illuminance range, in the control operation of FIG. 8 or 10. In FIG. 12, the same reference numerals as those in FIG. 9 indicate the elements having the same functions. The following description focuses only on differences from the example of FIG. 9.

Referring to FIGS. 7 and 12, when the current ambient illuminance belongs to the nighttime illuminance range, the mixed image 98, which is a result of the replacement, is provided to the display apparatus 72. The control apparatus 73 provides the display apparatus 72 with a reduced image 98p1 of the black and white visible image 95, and a reduced image 98p2 of the thermal image 96, to be displayed in a plurality of windows in a picture-in-picture (PIP) format, according to a user input through the user input unit 74.

In other words, while the mixed image 98 is being displayed, the reduced images 98p1 and 98p2 of actual black and white background and foreground are displayed. Accordingly, the surveillant's information recognition and situation handling abilities in the nighttime illuminance range may be further improved. In addition, the display position and size of the reduced image 98p1 of the black and white visible image 95 and the reduced image 98p2 of the thermal image 96 may be adjusted by user manipulation of the user input unit 74.

As described above, according to the method of controlling a surveillance system according to one aspect of the exemplary embodiments, and a surveillance system adopting the method, when the current ambient illuminance belongs to the daytime illuminance range, a background area is extracted from a color visible image. Thus, a color background image is generated.

When the current ambient illuminance belongs to the nighttime illuminance range, a background area of a black and white visible image from a visible imaging camera is replaced with the color background image. Thus, a mixed image, as a result of the replacement, is provided to a display apparatus.

According to the method of controlling a surveillance system according to another aspect of the exemplary embodiments, and the surveillance system adopting the method, when the current ambient illuminance belongs to the daytime illuminance range, a background area is extracted from a color visible image from a visible imaging camera. Thus, a color background image is generated.

When the current ambient illuminance belongs to the nighttime illuminance range, a black and white visible image, from a visible imaging camera, and a thermal image, from a thermal imaging camera, are mixed. Thus, a black and white mixed image, as a result of the mixing, is generated. Then, a background area of the generated black and white visible image is replaced with the color background image, and a mixed image as a result of the replacement is provided to a display apparatus.

In summary, when the current ambient illuminance belongs to the daytime illuminance range, a color background image is generated. When the current ambient illuminance belongs to the nighttime illuminance range, a black and white background image is replaced with a color background image.

Thus, even when the current ambient illuminance belongs to the nighttime illuminance range, a surveillant observing a moving picture through the display apparatus may quickly and accurately recognize a background image. Thus, the surveillant may quickly and accurately recognize a black and white foreground image in the color background image. In other words, surveillant's information recognition and situation handling abilities in the nighttime illuminance range may be equivalent to those in the daytime illuminance range.

While these exemplary embodiments have been particularly shown and described, it will be understood by those skilled in the art that various changes in form and details may be made therein without departing from the spirit and scope of the exemplary embodiments as defined by the appended claims.

What is claimed is:

1. A method of controlling a surveillance system having a visible imaging camera, which is a single lens camera, for obtaining a visible image of an object and a display apparatus, the method comprising:

when a current ambient illuminance belongs to a daytime illuminance range which is set to be greater than or equal to a first threshold illuminance, providing a color visible image of the object, obtained from the visible imaging camera, to the display apparatus, and generating a color background image, which is a still image, by extracting a background area from the color visible image;

when the current ambient illuminance belongs to a nighttime illuminance range which is set to be less than or equal to a second threshold illuminance:

obtaining a black and white visible image of the object from the visible imaging camera;

replacing a background area of the black and white visible image with the color background image generated when the current ambient illuminance range belongs to the daytime illuminance range; and providing a mixed image of the object as a result of the replacement to the display apparatus.

2. The method of claim 1, further comprising:

setting a medium illuminance range between the first threshold illuminance and the second threshold illuminance;

when the current ambient illuminance is changed from the medium illuminance range, where the color visible image is generated, to the nighttime illuminance range, generating the black and white visible image instead of the color visible image; and when the current ambient illuminance is changed from the medium illuminance range, where the black and white visible image is generated, to the daytime illuminance range, generating the color visible image instead of the black and white visible image.

3. The method of claim 1, wherein, when the mixed image is displayed at the display apparatus when the current ambient illuminance belongs to the nighttime illuminance range, a reduced image of the black and white visible image is displayed in at least one window in a picture-in-picture (PIP) format of the display apparatus.

4. The method of claim 1, further comprising, when the current ambient illuminance belongs to the nighttime illuminance range:

comparing the color background image to the background area of the black and white visible image;

if, as a result of the comparing, the color background image and the background area of the black and white visible image spatially match each other, replacing the background area of the black and white visible image with the color background image, and providing the mixed image as a result of the replacement to the display apparatus; and if, as the result of the comparing, the color background image and the background area of the black and white visible image do not spatially match each other, providing the black and white visible image without the replacing to the display apparatus.

5. The method of claim 2, wherein a lower end and a higher end of the medium illumination range are variably set according to a frequency of the change to the nighttime illumination range and/or the change to the daytime illumination range.

6. A method of controlling a surveillance system having a visible imaging camera, which is a single lens camera, for obtaining a visible image of an object, a thermal imaging camera for obtaining a thermal image, and a display apparatus, the method comprising:

when a current ambient illuminance belongs to a daytime illuminance range which is set to be greater than or equal to a first threshold illuminance, generating a color background image, which is a still image, by extracting a background area from a color visible image of the object obtained from the visible imaging camera; and when the current ambient illuminance belongs to a nighttime illuminance range which is set to be less than or equal to a second threshold illuminance:

obtaining a black and white visible image of the object from the visible imaging camera;

obtaining a thermal image of the object from the thermal imaging camera;

mixing the black and white visible image and the thermal image to generate a black and white mixed image;

replacing a background area of the black and white mixed image with the color background image generated when the current ambient illuminance belongs to the daytime illuminance range; and providing a mixed image of the object as a result of the replacement to the display apparatus.

7. The method of claim 6, wherein, when the current ambient illuminance belongs to the daytime illuminance range, the color visible image, from the visible imaging camera, and the thermal image, from the thermal imaging camera, are mixed with each other, and a color mixed image of the object as a result of the mixing is provided to the display apparatus.

8. The method of claim 6, further comprising:

setting a medium illuminance range between the first threshold illuminance and the second threshold illuminance;

when the current ambient illuminance is changed from the medium illuminance range, where the color visible image is obtained, to the nighttime illuminance range, generating the black and white visible image instead of the color visible image; and when the current ambient illuminance is changed from the medium illuminance range, where the black and white visible image is generated, to the daytime illuminance range, generating the color visible image instead of the black and white visible image.

9. The method of claim 6, wherein, when the mixed image is displayed at the display apparatus when the current ambient illuminance belongs to the nighttime illuminance range, a reduced image of the black and white visible image is displayed in at least one window in a picture-in-picture (PIP) format of the display apparatus.

10. The method of claim 6, further comprising, when the current ambient illuminance belongs to the nighttime illuminance range:

comparing the color background image to the background area of the black and white mixed image;

if, as a result of the comparing, the color background image and the background area of the black and white mixed image spatially match each other, replacing the background area of the black and white mixed image with the color background image, and providing the mixed image as a result of the replacement to the display apparatus; and if, as the result of the comparing, the color background image and the background area of the black and white mixed image do not spatially match each other, providing the black and white mixed image without the replacing to the display apparatus.

11. The method of claim 8, wherein a lower end and a higher end of the medium illumination range are variably set according to a frequency of the change to the nighttime illumination range and/or the change to the daytime illumination range.

12. A surveillance system, comprising:

a visible imaging camera which is a single lens camera obtaining a visible image;

a display apparatus; and a control apparatus, wherein, when a current ambient illuminance belongs to a daytime illuminance range which is set to be greater than or equal to a first threshold illuminance, the control apparatus provides a color visible image of an object, obtained from the visible imaging camera, to the display apparatus, and generate a color background image, which is a still image, by extracting a background area from the color visible image, and wherein, when the current ambient illuminance belongs to a nighttime illuminance range which is set to be less than or equal to a second threshold illuminance, the control apparatus:

obtains a black and white visible image of the object from the visible imaging camera;

replaces a background area of the black and white visible image with the color background image generated when the current ambient illuminance belongs to the daytime illuminance range; and provides a mixed image of the object as a result of the replacement to the display apparatus.

13. The surveillance system of claim 12, wherein the system sets a medium illuminance range between the first threshold illuminance and the second threshold illuminance, wherein the visible imaging camera comprises an optical sensor which indicates whether the current ambient illuminance belongs to the daytime illuminance range, the medium illuminance range, or the nighttime illuminance range, wherein when the current ambient illuminance is changed from the medium illuminance range to the nighttime illuminance range while the visible imaging camera generates the color visible image, the visible imaging camera discontinues generation of the color visible image and generates the black and white visible image, and wherein, when the current ambient illuminance is changed from the medium illuminance range to the daytime illuminance range while the visible imaging camera generates the black and white visible image, the visible imaging camera discontinues generation of the black and white visible image and generates the color visible image.

14. The surveillance system of claim 12, wherein, when the control apparatus displays the mixed image at the display apparatus when the current ambient illuminance belongs to the nighttime illuminance range, the control apparatus displays a reduced image of the black and white visible image on the color background image of the mixed image in a picture-in-picture (PIP) format of the display apparatus.

15. The surveillance system of claim 12, wherein when the current ambient illuminance belongs to the nighttime illuminance range, the control apparatus:

compares the color background image to the background area of the black and white mixed image;

if, as a result of the comparing, the color background image and the background area of the black and white mixed image spatially match each other, replaces the background area of the black and white mixed image with the color background image, and provides the mixed image as a result of the replacement to the display apparatus; and if, as the result of the comparing, the color background image and the background area of the black and white mixed image do not spatially match each other, provides the black and white mixed image without the replacing to the display apparatus.

16. A surveillance system, comprising:

a visible imaging camera which is a single lens camera obtaining a color visible image of an object;

a thermal imaging camera which obtains a thermal image of the object;

a display apparatus; and a control apparatus, wherein, when a current ambient illuminance belongs to a daytime illuminance range which is set to be greater than or equal to a first threshold illuminance, the control apparatus generate a color background image, which is a still image, by extracting a background area from the color visible image obtained from the visible imaging camera, and wherein, when the current ambient illuminance belongs to a nighttime illuminance range which is set to be less than or equal to a second threshold illuminance, the control apparatus:

obtains a black and white visible image of the object from the visible imaging camera;

obtains the thermal image from the thermal imaging camera;

mixes the black and white visible image and the thermal image to generate a black and white mixed image of the object;

replaces a background area of the black and white mixed image with the color background image generated when the current ambient illuminance belongs to the daytime illuminance range; and provides a mixed image of the object as a result of the replacement to the display apparatus.

17. The surveillance system of claim 16, wherein, when the current ambient illuminance belongs to the daytime illuminance range, the color visible image, from the visible imaging camera, and the thermal image, from the thermal imaging camera, are mixed with each other and a color mixed image of the object as a result of the mixing is provided to the display apparatus.

18. The surveillance system of claim 16, wherein the system sets a medium illuminance range between the first threshold illuminance and the second threshold illuminance, wherein the visible imaging camera comprises an optical sensor which indicates whether the current ambient illuminance belongs to the nighttime illuminance range, the medium illuminance range, or the nighttime illuminance range, wherein, when the current ambient illuminance is changed from the medium illuminance range to the nighttime illuminance range while the visible imaging camera generates the color visible image, the visible imaging camera discontinues generation of the color visible image and generates the black and white visible image, and wherein, when the current ambient illuminance is changed from the medium illuminance range to the daytime illuminance range while the visible imaging camera generates the black and white visible image, the visible imaging camera discontinues generation of the black and white visible image and generates the color visible image.

19. The surveillance system of claim 16, wherein, when the control apparatus displays the mixed image at the display apparatus when the current ambient illuminance belongs to the nighttime illuminance range, the control apparatus displays a reduced image of the black and white visible image or a reduced image of the thermal image on the color background image of the mixed image in a picture-in-picture (PIP) format of the display apparatus.

20. The surveillance system of claim 16, wherein when the current ambient illuminance belongs to the nighttime illuminance range, the control apparatus:

compares the color background image to the background area of the black and white mixed image;

if, as a result of the comparing, the color background image and the background area of the black and white mixed image spatially match each other, replaces the background area of the black and white mixed image with the color background image, and provides the mixed image as a result of the replacement to the display apparatus; and if, as the result of the comparing, the color background image and the background area of the black and white mixed image do not spatially match each other, provides the black and white mixed image without the replacing to the display apparatus.

\* \* \* \* \*